March 20, 1962 M. B. RIGGS 3,025,569
MOLDING INFLATABLE ARTICLES
Filed Aug. 9, 1957 2 Sheets-Sheet 1

*INVENTOR.*
MART B. RIGGS

BY

*R. L. Miller*
ATTORNEY

March 20, 1962  M. B. RIGGS  3,025,569
MOLDING INFLATABLE ARTICLES

Filed Aug. 9, 1957  2 Sheets-Sheet 2

INVENTOR.
MART B. RIGGS

BY  R. L. Miller
ATTORNEY

United States Patent Office 3,025,569
Patented Mar. 20, 1962

3,025,569
MOLDING INFLATABLE ARTICLES
Mart B. Riggs, Akron, Ohio, assignor to The Goodyear Tire & Rubber Company, Akron, Ohio, a corporation of Ohio
Filed Aug. 9, 1957, Ser. No. 677,326
10 Claims. (Cl. 18—38)

This invention relates to molded articles having a valve incorporated in the wall thereof and in particular to the method of forming and molding a valve plug receiving opening in the wall of a tire for reception of and for retaining a valve plug therein.

The use of apertures in the walls of inflatable articles for various purposes is a common practice. In some instances an aperture is necessary for the purposes of accommodating a valve, as in a ball. In other instances, holes which may or may not completely penetrate the wall are desired for venting purposes, as in certain pneumatic tires. Recent developments in the tire art, particularly of the tubeless variety, have given rise to the need for a hole through the sidewall of such a tire to accommodate a valve to be used for inflating the tire. Location of a valve in such a position may be necessary in multi-compartment tires to inflate individual compartments or may be required in any type of tire because of the reduction in valve room on the wheel rims as they are made smaller in diameter in keeping with modern design trends.

However, providing a hole through the sidewall of a pneumatic tire or an article of similar construction presents some problems not found in many of the allied arts by reason of the fact that, in many cases, the wall structure has reinforcing members therein whose strength and location must be disturbed as little as possible to avoid failure in service. Furthermore, the valve and the area adjacent thereto are subject to extreme flexure as well as a differential pressure while in use, and to scuffing and abrasion from contact with external surfaces frequently encountered, which adds further problems to the production of a durable article.

Therefore, it is a major object of the present invention to provide a simple method and apparatus for molding an aperture in the wall of an inflatable article which will not unduly damage the wall or reinforcing elements which may be incorporated therein.

It is a further object to provide an aperture in the wall of an inflatable article which will cooperate with a valve inserted therein to prevent expulsion or displacement of the valve due to flexure of the wall or the internal pressure of the article encountered in service.

An additional object of the present invention is to provide an aperture in the wall of an inflatable article of a character which will minimize damage to or loss of a valve included therein due to scuffing or rubbing by external surfaces.

These and other objects of the invention will become apparent from the following description and drawings in which.

As previously mentioned, many inflatable articles are required to have holes or vents through or partially through the walls thereof for a variety of reasons. In some instances the necessary apertures may be cut or drilled without deleterious effects on the reliability and durability of the article. However, in the case of an inflatable article having fabric or other reinforcing elements embedded in its walls, particularly where such elements must withstand severe strains, cutting or drilling an aperture results in the severing and abrading of some of the reinforcing elements whereby the article is weakened and may fail in service. Furthermore, where the aperture is made through the wall of an article in order to receive a valve, it is desirable and in many cases necessary that the walls defining the aperture be of a character so as to cooperate with the valve and hold it in place during service which may include severe repetitive strains being placed on such an area. Moreover, it is usually desirable or necessary to cement the valve in place in the wall of the article. It has been found that a cut or drilled aperture has a relatively smooth surface which does not cooperate with the valve to hold it in place to the desired degree. In addition, the adhesive used to hold the valve is wiped off the smooth surfaces of a cut or drilled aperture in the process of inserting the valve, resulting in very poor adhesion between the valve and wall of the article. In order to assure that sufficient adhesive is present to bind the valve in place, it has heretofore been necessary to roughen the surface of the aperture with a rasp or similar article which provides little cuts or channels in which the adhesive is retained. It is obvious that this roughening process is time consuming, necessitating an additional operation in manufacture and, hence adding to the cost of the article. Furthermore, the rasping action may result in abrasion of reinforcing elements lying along the periphery of the aperture which may result in subsequent failure due to weakening of those elements. The present invention avoids the problems which arise with cut or drilled apertures and provides a simple but highly effective method and apparatus for providing an aperture in the wall of an inflatable article which is particularly effective when it is desired to place therein a needle valve composed of an elastomeric material. It should be noted that the present invention is not restricted to molding valve holes in tire sidewalls but may be used for a variety of articles. However, the invention will be described with reference to a pneumatic tire of the tubeless variety since it is a well-understood field and the present invention makes a substantial contribution to it.

Figure 1:
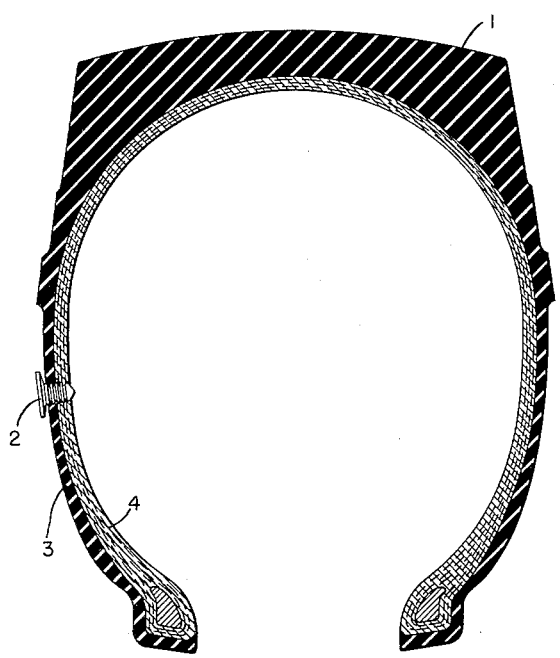
FIG. 1 is a cross-section of a pneumatic tire showing a step in the practice of the present invention.

Referring to the drawings, FIG. 1 represents an uncured or "green" tire 1 with a mold pin 2 of the present invention inserted partially into the sidewall 3 which has a plurality of reinforcing plies 4 therein. The mold pin 2 shown in FIG. 1 is of the type shown in detail in FIG. 6, although other types of pins, including those shown in FIGS. 7 and 8, may be used. The mold pin 2 may ordinarily be inserted into the green tire in any convenient manner since the uncured tire carcass is not difficult to pierce, and the reinforcing cords, being in a relaxed state, move relatively easily to permit entry of the pin. However, in some cases it is preferable to use a long narrow awl to pierce the tire sidewall and provide a pilot hole to guide the pin and facilitate its insertion. The awl to be used for this purpose should be designed so that it will not sever any of the tire cords as it is inserted in the tire.

There are particular advantages in the method of the present invention wherein the mold pin is inserted into an unvulcanized tire carcass. One principal advantage being that the tire cords, not yet being firmly bound in position, nor under any tensioning force as yet, may shift position to permit passage of the pin without severing or abrading the cords as occurs in the process of drilling or cutting an aperture in the cured article. An additional advantage of the loose pin over, for example, a pin made an integral part of or secured to the article mold, resides in the ability of the loose pin to "float" with the tire as it expands and shifts in the mold during the curing process. A pin which is fixed with respect to the mold will tend to tear or distort a tire as it shifts in the mold since the pin is not free to move with it.

Figure 2:
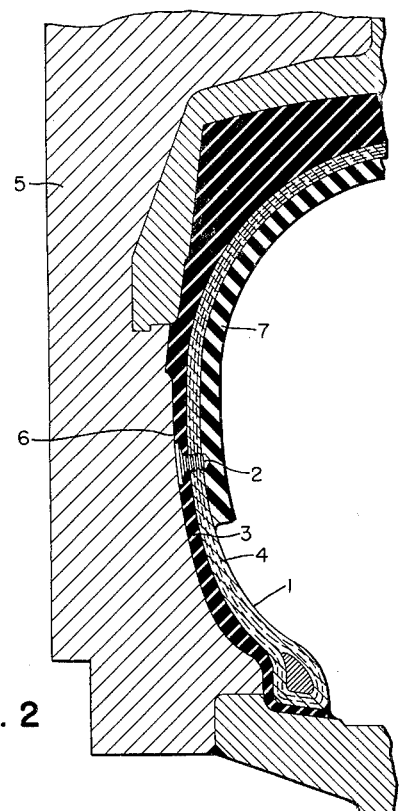
FIG. 2 is a cross-section of a tire in a vulcanization mold showing a further step in the practice of the present invention.

Ordinarily, the mold pin 2 need be inserted initially only far enough into the tire wall to hold it in position since pressure exerted on the tire in the usual molding methods will seat the pin fully in position as appears in FIG. 2. In FIG. 2 the green tire 1 is shown in place in a tire mold 5. The mold may be any of the commonly used types, the drawing being merely illustrative of the method of the invention. As can be seen in FIG. 2, the mold pin 2 is pressed fully into the sidewall 3 of the tire by the reactive force of the mold wall 6 due to expansion of the tire in situ by a pressurizing fluid as is commonly used in the tire vulcanizing art. A curing bag or bladder 7 is shown inside the tire as providing the expansion pressure which is according to present practices. It is preferable that the tire be vulcanized immediately after insertion of the pin in order to prevent loss of the pin and also avoid possible abrasion of the aperture wall due to shifting of the pin from external forces. Upon completion of the cure it is likewise preferable that the mold pin be immediately removed from the tire. This is desirable in hot vulcanizing processes since the pin is more easily withdrawn if the rubber or other elastomer is still at an elevated temperature. It should be noted, however, that it is not essential to the practice of the method of the invention that a hot cure process be used. If the article is to be vulcanized it may be by means of heat, chemicals, or nuclear or other radiation. At any rate, early removal of the pin after completion of any molding process used is advantageous in that it reduces the possibility of losing pins or abrading the portion of the carcass adjacent the pin due to random movement of the pin in subsequent handling of the article.

Figure 6:
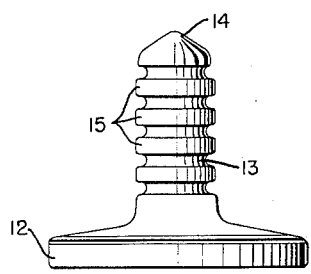
FIGS. 6, 7 and 8 are illustrations of typical mold pins of the present invention.
Figure 7:
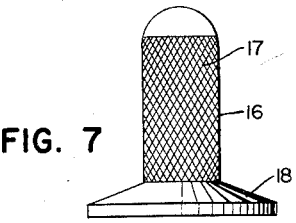
Figure 8:
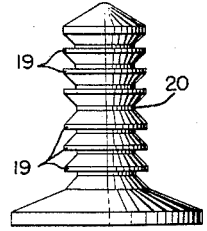
Figure 11:
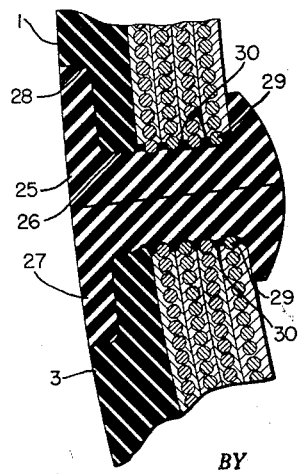
FIG. 11 is a cross-section detail of the valve and tire wall of FIG. 10.

It is apparent that this method of providing a molded aperture if it utilizes mold pins of the type shown in FIGS. 6, 7 and 8 will produce an aperture having embossed or serrated walls which are negatives of the surface of the pin used. For example, it is obvious that an aperture, such as shown in FIG. 11, having circumferential ridges 29 on the walls thereof is produced if one uses a pin of the type illustrated in FIG. 6.

As will appear later, the ridges on the walls of the aperture provide recesses for the adhesive being used and in addition form a tight compressive fit on the valve body.

Figure 3:
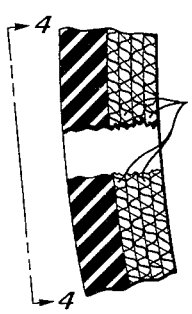
FIG. 3 is a partial section of a tire showing a valve hole which has been cut or drilled.
Figure 4:
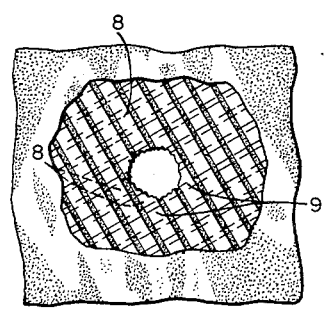
FIG. 4 is a view along line 4—4 of FIG. 3.
Figure 5:
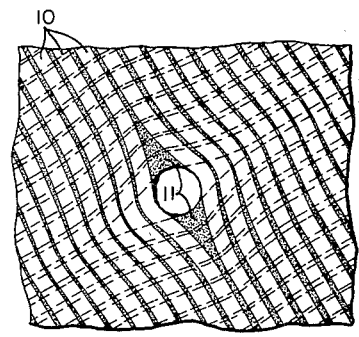
FIG. 5 is a view similar to FIG. 4 illustrating certain results of the practice of the present invention.

Referring to FIGS. 3, 4 and 5, a comparison may be made between a cut or drilled aperture and an opening or aperture produced by the practice of the present invention insofar as the effect on the fabric reinforcing elements of a tire carcass. In FIGS. 3 and 4, which represent a section of a tire carcass in which a hole has been cut or drilled, the severed cords 8 and severely abraded cords 9 are clearly apparent. It is obvious that under the severe strains placed on tires in modern transportation such a condition represents a serious weakness.

As can be seen in FIG. 5, in the practice of the present invention the cords 10, which for the sake of clarity have been shown greatly exaggerated, are displaced about the pin but remain unsevered and intact in contrast with the cut and abraded cords resulting from a cut or drilled aperture. FIG. 5 further illustrates how the cords 10 of the individual opposed plies of the tire carcass are arranged in arcs about the aperture and points to another distinct advantage of the present invention. It can be appreciated that the arcuate portions of the cords 10, which bound the valve opening, will tend to be drawn into a straight line when placed under tension due to inflation of the tire. This tendency to return to a straight line position results in a high compressive force being exerted on the body of a valve inserted therein holding the valve tightly in place and also increasing the seal between the valve and the carcass. Furthermore, in a tire wherein the carcass reinforcing members are composed of a heat-shrinkable material, this compressive effect is enhanced considerably since as the tire is run at high speeds or long distances it heats up, which tends to contract the heat-shrinkable reinforcing elements, as well as increase the inflation pressure in the tire, resulting in increased binding on the valve and better carcass to valve seal as the severity of use increases. It is thus apparent that a tire, where a valve aperture resulting from the practice of the present invention is utilized, is provided with a self-compensating sealing structure in the valve area which increases in effectiveness as it is subjected to more severe use or higher pressures.

FIG. 5 also illustrates the fact that during molding the plastic elastomeric material 11 used in the tire sidewall flows in around the pin to occupy any voids left by the shifting of the cords 10 to assure sealing at the walls of the aperture.

FIGS. 6, 7 and 8 illustrate three types of pins for use in molding a valve hole.

In FIG. 6 the pin has a head 12, a cylindrical body 13 attached thereto and a substantially rounded or hemispherical tip 14. The body has a number of raised circumferential ridges or serrations 15 thereon which result in the displaced ridges 29 on the aperture walls as can be seen in FIG. 11. The head 12 performs several functions. It prevents the pin from being pushed too far into the sidewall of the tire which might result in an imperfect hole due to flow of the elastomer over the butt of the pin if it is within the outer sidewall surface. Secondly, the head provides a recess in the outer face of the sidewall which permits the countersinking of the valve head to avoid scuffing and tearing of the valve in subsequent use. This may be seen in FIGS. 10 and 11 where the valve 25, seated in the aperture 26, is composed of an elastomeric material and has a large outer head portion 27 countersunk in the recess 28. It is apparent that this head portion may become scuffed or torn or the valve ripped from the tire in use if the edges and surface of the valve head extend outwardly of the sidewall surface. The head 12 provides the countersinking recess 28 for the valve head 27 and thus avoids this problem. The substantially hemispherical tip 14 on the pin assures that the reinforcing elements in the tire carcass will not be severed or abraded during insertion of the pin and also that the curing bag or bladder on the interior will not be punctured or abraded upon expansion into contact with the tire interior. FIG. 7 shows a pin with the surfaces of the body 16 having knurls 17 thereon and a slightly different head 18. FIG. 8 illustrates a pin in which the serrations 19 on the body 20 are angularly disposed with the serrations on half of the shank opposing those of the other. The use of this pin results in ridges on the walls of the aperture which offer dynamic opposition to longitudinal movement of a valve during use. It is obvious that a smooth bodied pin may be employed if desired, retaining the advantages of the displaced rather than severed cords, while providing a smooth rather than serrated aperture wall, if such is required. The material of construction of the pin may, of course, be chosen to suit the particular use or process. Thus high dielectric strength, high conductivity, high radiation resistance or other characteristics may be obtained by a choice of materials.

The total length of the pin is chosen so that the aperture may be molded to any desired depth or through any desired thickness but the pin will not project to any substantial degree into the interior of the article and damage or distort the curing bag to the point that it does not perform satisfactorily its function. Furthermore, the pin is made with a maximum shank diameter greater than the distance between the closely spaced reinforcing cords in order to secure the advantages of peripheral cord compression at the aperture walls, as discussed previously with reference to FIG. 5.

Figure 9:
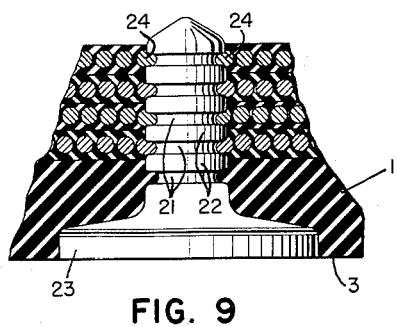
FIG. 9 is a view of a mold pin in a tire section showing the relationship thereto of the reinforcing elements in the wall thereof.

FIG. 9 illustrates an additional advantageous result of using the particular type of pins illustrated in FIGS. 6 and 8. If the spaces 21 between the embossments 22 on the body of the pin 23 are made sufficiently large to accommodate, at least in part, a tire cord or other reinforcing member, a condition such as shown in FIG. 9 results. It is seen in that figure that some of the closely spaced carcass reinforcing elements 24 have moved in towards the longitudinal center line of the pin 23 during the application of pressure on the tire during cure to occupy the space 21 between the embossments 22. This not only provides a dam to prevent loss of the adhesive used to bind the valve in place but also provides intimate constrictive contact between the valve body and the reinforcing elements which adds to the retentive forces on the valve when the article is inflated since the cord-reinforced embossments tend to embed themselves in the valve body.

Figure 10:
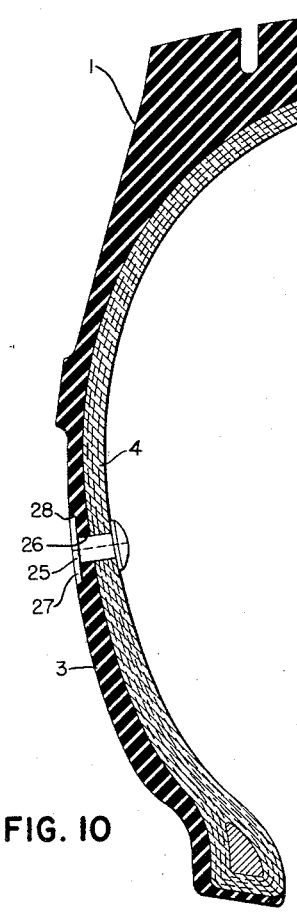
FIG. 10 is a cross-section of a finished tire showing a valve in place.

FIGS. 10 and 11 illustrate a tire 1 with a valve 25 in the aperture 26 in the sidewall 3 thereof and show the product resulting from the practice of the present invention. The advantage of the countersunk valve head 27 for protection against scuffing or abrading is clearly seen. It is preferable to mold the valve hole to a diameter substantially less than the minimum diameter of the valve in order to secure a tight compressive fit. At the same time, the maximum body diameter of the pin should, as previously mentioned, be greater than the cord spacing. As can be seen in FIG. 11, the ridges 29 formed on the walls of the aperture, in at least some of which cords are embedded, compress about and tend to embed in the valve to hold it and at the same time provide a series of pools or wells 30 to trap and hold the adhesive which binds the valve 25 to the tire sidewall 3. The advantages of a molded aperture having an embossed wall for the accommodation of a valve are clearly seen in FIG. 11 and the reliability and simplicity of the resulting article becomes obvious.

While certain representative embodiments and details have been shown for the purpose of illustrating the invention, it will be apparent to those skilled in this art that various changes and modifications may be made therein without departing from the spirit or scope of the invention.

I claim:

1. The method of forming a molded valve receiving opening in the wall of a tire in which the wall is made of a rubbery material comprising the steps of inserting a pin through the wall of the tire before complete vulcanization and while the rubbery material may be readily displaced, said pin being otherwise unrestrained in the transverse direction and having a peripheral wall of suitable size and shape to form the desired-shaped opening in the said tire wall and a length to extend substantially through the tire wall, vulcanizing the tire in a mold with the pin so positioned in the tire and freely movable with said tire in the direction along the mold walls, urging the tire wall and, consequently, the pin against the wall of the mold during said vulcanization and then extracting the pin.

2. The method of forming a molded aperture in the wall of a tire to receive a valve plug having an enlarged head portion in which the wall of the tire is made of a rubbery material comprising the steps of inserting a pin into the wall of the tire before complete vulcanization and while the rubbery material may be readily displaced, said pin being otherwise unrestrained in the transverse direction and having an enlarged head portion of a size required for reception of the head portion of the said valve plug and a peripheral wall of suitable size and shape to form the desired valve-receiving opening in the said tire wall, the total length of the pin being substantially equal to the thickness of the tire wall, vulcanizing the tire in a mold with the pin positioned in the tire and freely movable with said tire in the direction along the mold walls and with the enlarged head position outside the exterior of the tire wall, urging the tire wall and, consequently, the pin against the wall of the mold during said vulcanization whereby the enlarged head portion of the pin is embedded in the rubbery wall to form a valve head receiving recess therein, and then extracting the pin.

3. The method of forming a molded valve-receiving opening in the wall of a tire in which the wall is made of a rubbery material and strain-resisting reinforcing cords, closely spaced with respect to each other, embedded in the rubbery material, comprising the steps of inserting a pin through the wall of the tire, before complete vulcanization and while the rubbery material may be readily displaced, said pin being otherwise unrestrained in the transverse direction and having a peripheral wall of suitable size and shape to form the desired shaped opening in the said tire wall and said pin having a maximum thickness greater at least in part than the cord spacing in the wall, whereby as the pin is forced through the rubbery material it spreads the cords, the pin being of a length to extend substantially through the tire wall, vulcanizing the tire in a mold with the pin so positioned in the tire and freely movable with said tire in the direction along the mold walls, urging the tire wall and, consequently, the pin against the wall of the mold during said vulcanization and then extracting the pin.

4. The method of forming a molded valve-receiving opening in the wall of a tire in which the wall is made of a plurality of layers each of which comprises rubbery material and strain-resisting reinforcing cords embedded in the rubbery material in substantially parallel relation and closely spaced with respect to each other, successive layers in said wall being so disposed that the cords therein are at a substantial angle with respect to cords in adjacent layers, comprising the steps of inserting a pin through the wall of the tire, before complete vulcanization and while the rubbery material may be readily displaced, said pin being otherwise unrestrained in the transverse direction and having a peripheral wall of suitable size and shape to form the desired shaped opening in the said tire wall and said pin having a maximum thickness greater at least in part than the spacing of the cords in the wall, whereby as the pin is forced through the rubbery material it spreads the cords, the pin being of a length to extend substantially through the tire wall, vulcanizing the tire in a mold with the pin so positioned in the tire and freely movable with said tire in the direction along the mold walls, urging the tire wall and, consequently, the pin against the wall of the mold during said vulcanization, and then extracting the pin.

5. The method of forming a molded valve-receiving opening in the wall of a tire in which the wall is made of a plurality of layers each of which comprises rubbery material and strain-resisting reinforcing cords embedded in the rubbery material in substantially parallel relation and closely spaced with respect to each other, successive layers being disposed so that the cords therein are at a substantial angle with respect to the cords in adjacent layers, comprising the steps of inserting a pin through the wall of the tire, before complete vulcanization and while the rubbery material may be readily displaced, said pin being otherwise unrestrained in the transverse direction and having a peripheral wall of suitable size and shape to form the desired shape opening in the said tire wall and said pin having a maximum thickness greater at least in part than the cord spacing in the wall and terminating in a generally rounded tip, whereby as the pin is forced through the rubbery material it spreads the cords, the pin being of a length to extend substantially through the tire wall, vulcanizing the tire in a mold with the pin so positioned in the tire and freely movable with said tire in the direction along the mold walls, urging the tire wall and consequently, the pin against the wall of the mold during said vulcanization, and then extracting the pin.

6. The method of forming a molded opening in the wall of a tire to receive a valve plug having an enlarged head portion in which the wall of the tire is made of a rubbery material and strain-resisting reinforcing cords, closely spaced with respect to each other, embedded therein, the outer portion of said wall comprising a layer of rubbery material of appreciable thickness without strain-resisting elements therein, comprising the steps of inserting a pin into the wall of the tire before complete vulcanization and while the rubbery material may be readily displaced, said pin being otherwise unrestrained in the transverse direction and having an enlarged head portion of a size required for reception of the head portion of the said valve plug and a peripheral wall of suitable size and shape to form the desired-shaped valve-receiving opening in the said cord reinforced portion of said tire wall and of a maximum thickness substantially greater at least in part than the cord spacing in the wall, whereby as the pin is forced through the rubbery material it spreads the cords apart, the total length of the pin being substantially equal to the thickness of the tire wall, vulcanizing the tire in a mold with the pin positioned in the tire and freely movable with said tire in the direction along the mold walls and with the enlarged head portion outside the exterior of the tire wall, urging the tire wall and, consequently, the pin against the wall of the mold during the vulcanization whereby the enlarged head portion of the pin is forced into embedded position in the rubbery tire wall to form a valve head receiving recess therein, and then extracting the pin.

7. The method of forming a molded valve-receiving opening in the wall of a tire, and in which said opening is to be provided with valve retaining protuberances on the peripheral wall thereof, said wall of said tire being made of a rubbery material having closely spaced strain-resisting reinforcing cords embedded therein, comprising the steps of inserting a pin through the wall of the tire before complete vulcanization and while the rubbery material may be readily displaced, said pin being otherwise unrestrained in the transverse direction and of the desired size to form the wall of a valve receiving opening therein and provided with an embossed outer surface, said embossed surface of the pin being of a greater maximum thickness at least in part than the spacing of the cords in the tire wall, whereby as the pin is forced through the rubbery material the cords are spread apart and the pin being of a length to extend substantially through the tire wall, vulcanizing the tire in a mold with the pin so positioned in the tire and freely movable with said tire in the direction along the mold walls, urging the tire wall and, consequently, the pin against the wall of the mold during said vulcanization, and then extracting the pin.

8. Apparatus for molding a tire and for simultaneously molding a valve plug receiving opening in the wall of the tire comprising a mold for shaping the outer surface of the tire, a flexible inflatable pressure receiving element for engaging the inner wall of the tire to urge the tire under pressure against said mold, and a removable pin insertable in the tire wall from one side thereof to the other in its unvulcanized state, said pin being otherwise unrestrained in the transverse direction and substantially equal in length to the thickness of said wall whereby during the molding operation one end of the pin engages the inner wall of the mold and the other end of the pin engages the said pressure member without substantial distortion or damage thereto.

9. The method of forming a molded valve receiving opening in the wall of a tire in which the wall is made of a rubbery material having reinforcing cords embedded therein comprising the steps of inserting a pin through the wall of the tire while it is in an unstressed and unvulcanized state and the rubbery material and reinforcing cords therein may be readily displaced, said pin being otherwise unrestrained in the transverse direction and having a peripheral wall of suitable size and shape to form the desired-shaped opening in said tire sidewall and a length to extend substantially through the tire wall, vulcanizing the tire in a mold with the pin so positioned in the tire and freely movable with said tire in the direction along the mold walls, urging the tire wall and, consequently, the pin against the wall of the mold during said vulcanization and then extracting the pin.

10. The method of forming a molded valve receiving opening in the wall of a tire to receive a valve plug having an enlarged head portion in which the wall of the tire is made of a rubbery material having reinforcing cords embedded therein comprising the steps of inserting a pin into the wall of the tire while it is in an unstressed and unvulcanized state and the rubbery material and reinforcing cords therein may be readily displaced, said pin being otherwise unrestrained in the transverse direction and having an enlarged head portion of a size required for reception of the head portion of the said valve plug and a peripheral wall of suitable size and shape to form the desired valve receiving opening in the said tire wall, the total length of the pin being substantially equal to the thickness of the tire wall, vulcanizing the tire in a mold with the pin positioned in the tire and freely movable with said tire in the direction along the mold walls and with the enlarged head portion outside the exterior of the tire wall, urging the tire wall and, consequently, the pin against the wall of the mold during said vulcanization whereby the enlarged head portion of the pin is embedded in the rubbery wall to form a valve head receiving recess therein, and then extracting the pin.

References Cited in the file of this patent

UNITED STATES PATENTS

| | | |
|---|---|---|
| 1,236,534 | Blodgett | Aug. 14, 1917 |
| 1,381,179 | Gerson | June 14, 1921 |
| 1,387,805 | Roberts | Aug. 16, 1921 |
| 1,666,883 | Lambert | Apr. 17, 1928 |
| 1,917,929 | Duffy | July 11, 1933 |
| 2,318,115 | Tubbs | Mar. 4, 1943 |
| 2,331,630 | Rempel | Oct. 12, 1943 |
| 2,634,785 | Tubbs | Apr. 14, 1953 |
| 2,666,007 | Hovey | Jan. 12, 1954 |
| 2,670,499 | Weigold et al. | Mar. 2, 1954 |
| 2,746,812 | Eger | May 22, 1956 |
| 2,759,389 | Corckran | Aug. 21, 1956 |
| 2,765,697 | Brush | Oct. 9, 1956 |

OTHER REFERENCES

Publication: "Tires—TBA Merchandising," June 1956, page 47.